(12) United States Patent
Satori et al.

(10) Patent No.: US 6,267,362 B1
(45) Date of Patent: Jul. 31, 2001

(54) LIQUID SEALED TYPE ELASTIC MOUNT

(75) Inventors: Kazutoshi Satori; Toru Sakamoto, both of Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 09/361,305

(22) Filed: Jul. 27, 1999

(30) Foreign Application Priority Data

Feb. 10, 1999  (JP) .................................................. 11-033465

(51) Int. Cl.$^7$ ....................................................... F16M 5/00
(52) U.S. Cl. ...................................... 267/140.13; 267/219
(58) Field of Search ........................... 267/140.11, 140.12, 267/140.13, 140.14, 219, 140.3, 141.2, 141.6; 248/562, 636

(56) References Cited

U.S. PATENT DOCUMENTS

| | | |
|---|---|---|
| 5,167,403 | 12/1992 | Muramatsu et al. . |
| 5,180,148 | * 1/1993 | Muramatsu ..................... 267/140.14 |
| 5,642,873 | * 7/1997 | Kato ................................. 267/140.14 |
| 5,667,205 | 9/1997 | Mutoh et al. . |
| 5,772,189 | * 6/1998 | Satori et al. ..................... 267/140.13 |
| 5,855,364 | * 1/1999 | Reh et al. ........................ 267/140.13 |
| 6,131,894 | * 10/2000 | Satori et al. ..................... 267/140.13 |

FOREIGN PATENT DOCUMENTS 2055172A   2/1991  (GB) .

6223178    1/1981  (JP) .

* cited by examiner

*Primary Examiner*—Robert J. Oberleitner
*Assistant Examiner*—Melanie Torres
(74) *Attorney, Agent, or Firm*—Birch, Stewart, Kolasch & Birch, LLP

(57) ABSTRACT

A liquid chamber is arranged with a first support member 1, a second support member 2 and an elastic member 3, an inside of the liquid chamber is divided to a main liquid chamber 11 and an auxiliary liquid chamber 12 by a partition member 10 and both chambers are communicated with a damping orifice passage 14 and an idle orifice passage 15. On an inner face of a conical portion 4 of the elastic member 3, thin wall portions 7 are provided by forming recess 6 at axially symmetrical position so as to yield a minimum value for a dynamic spring characteristic against a vibration input in a designated medium frequency by a membrane resonance. A non-circular medium to high frequency device 20 projecting into the main liquid chamber 11 is provided to the first support member 1 so as to resonate by liquid column against a vibration input in a designated high frequency. Utilizing an elastic orifice member 31 the idle orifice passage 15 is formed and a part thereof is made to be an integrated elastic membrane portion 16 so as to have a non-linear spring characteristic that changes spring constant thereof by magnitude of vibration input. It becomes possible to absorb the vibration by elastic deformation through increasing of an inner pressure of liquid and to prevent large deformation by a large deformation control portion when a large vibration is inputted.

14 Claims, 13 Drawing Sheets

LIQUID SEALED TYPE ELASTIC MOUNT

BACKGROUND OF THE INVENTION

1. Field of the Invention

The present invention relates to a liquid sealed type elastic mount such as an engine mount for an automotive vehicle.

2. Description of the Prior Art

Such a liquid sealed type elastic mount is disclosed for example in Japanese Patent Publication (Kokoku) No. Sho 62-23178, comprising a first support member for attachment to a vibration source, a cylindrical shaped second support member for attachment to a vehicle body, a conical shaped rubber body interposed between the two support members, and a liquid chamber formed within the rubber body to receive buffering liquid therein, wherein a disk shaped member is provided projecting from the first support member into the second support member, a partition member is arranged to divide the second support member into two chambers, an annular passage is formed between an outer peripheral portion thereof and an inner wall of the second support member, and a thin wall portion is partially provided on the rubber body to function as a diaphragm or a diaphragm is provided on a bottom portion of the second support member. In the present invention, we mean a frequency below 400 Hz by a low frequency range, a frequency of 40 to 500 Hz by a medium frequency range, a frequency above 500 Hz by a high frequency range, and especially a frequency of 500 to 1000 Hz in the high frequency range by a medium to high frequency range.

According to an above-described construction, since it is aimed to damp vibrations by means of flow resistance of the disk shaped member, the mount can deal with vibrations merely in the region of 10 Hz. However, it starts to have a high dynamic spring characteristic in a medium frequency range of for example 100 to 500 Hz and in a medium to high frequency range of for example 500 to 1000 Hz. On the other hand, it is known that an open and close type idle orifice passage, which communicates only when it is in a state of engine idling, is provided, whereby a low dynamic spring characteristic is realized. In this case also however, the mount has a low dynamic spring characteristic only in the idling range and it can not contribute for lowering the dynamic spring characteristic in other frequency range where the idle orifice passage is closed.

Further, it is known that the rubber wall of the liquid chamber is formed with a uniform thickness in a circumferential direction and a disk shaped member, which is connected to the first support member and projects into the liquid chamber, whereby a low dynamic characteristic is realized in the medium to high frequency range. In such a liquid sealed type mount, the disk shaped member acts as a medium to high frequency device and liquid column resonance is generated at a specified frequency in the medium to high frequency range, accompanied by a flow of liquid in a gap between the peripheral rubber wall and the disk shaped member.

However, even if the dynamic spring constant becomes low in the medium to high frequency range through liquid column resonance by means of the medium to high frequency device, since a peak appears by a reaction of the low dynamic spring constant in a somewhat higher frequency, which results in a high dynamic spring constant in the high frequency range. In recent years, it is a requirement that if there is a low dynamic spring constant in a low frequency range, it is also required that the dynamic spring characteristic is made lower not only in the medium to high frequency range but also in the high frequency range, and a low dynamic spring characteristic is thus realized in a wide frequency range.

SUMMARY OF THE INVENTION

In order to solve the above subject, there is provided a liquid sealed type elastic mount comprising: a first support member for attachment to a vibration source; a second support member for attachment to a vehicle body; an elastic member of substantially conical shape interposed between the first and second support members, the first support member and second support member being adapted to form a liquid chamber therebetween with at least a part of a wall thereof; a partition wall dividing the liquid chamber into a main liquid chamber and an auxiliary liquid chamber; an orifice passage formed within the partition wall for normally communicating the two liquid chambers; wherein a part of the orifice passage is formed of an elastic membrane portion which deforms elastically by rising of an inner pressure of the sealed liquid.

Since a elastic membrane is provided at a part of the orifice passage, a low dynamic characteristic is realized by means of elastic deformation of the elastic membrane portion when inner pressure of liquid increases. In addition, it is not required that the elastic membrane portion is provided at a remote position from the orifice passage, since a part of the orifice passage is constructed by the elastic membrane portion. Constitution of a liquid sealed mount thus becomes simple and miniaturization of the mount becomes possible.

The elastic membrane portion may be provided close to an inlet of the orifice passage, whereby it is possible to flow a higher pressure part of the liquid flowing into the orifice passage to the elastic membrane portion. This makes elastic deformation of the elastic membrane large to effectively absorb an increasing amount of inner pressure.

The elastic membrane portion may .be formed integrally with the orifice passage or as a separated body therefrom. When the elastic membrane portion is formed integrally with the orifice passage, it becomes easy to form the elastic membrane because it is not required to form especially the same alone. Whereby it can be achieved to decrease the number of parts, to reduce working cost, and to stabilize quality of products. On the contrary when the elastic membrane portion is formed as a separated body from the orifice passage, since material property of the elastic membrane portion can be changed from that of an orifice passage, it is easy to change a characteristic of the elastic membrane portion.

The elastic membrane portion may be made to show a nonlinear spring characteristic for magnitude of vibration input. When a small vibration is inputted, the spring constant is lowered, whereby an increasing amount of liquid pressure is effectively absorbed and the dynamic spring constant is made to be low. On the other hand, when a large vibration is inputted, the spring constant is made higher, whereby it can be prevented for the elastic membrane portion to largely deform.

At the same time, even if displacement increases by the vibration input, since it is possible to control reduction of liquid flow through the orifice passage, an effect by means of the orifice can be steadily achieved.

Hereupon, by a non-linear spring characteristic in the present invention, we mean a characteristic in which a spring constant of the elastic membrane portion does not change in proportion to magnitude of a vibration input in such a way that the spring constant suddenly rises when the vibration input increases to a certain extent.

A large deformation-controlling portion may be formed on a part of the elastic membrane portion. Thereby when a large vibration is inputted, deformation of the elastic membrane portion can be restrained by the large deformation controlling portion. Hence large deformation of the elastic membrane portion can be effectively prevented and durability of the device can be improved.

The orifice passage may comprise a plurality of the passages including a damping orifice passage usually communicating the two liquid chambers and an open and close type idle orifice passage communicating only when it is in an engine idling condition, and the elastic membrane portion may be formed on at least one of the orifice passages.

Thereby even in a condition that the idle orifice is closed, a low dynamic spring constant can be realized and lowering of the spring constant is remarkably achieved especially in the low frequency range.

The elastic membrane portion formed on at least one of the orifice passages may be arranged to show the nonlinear spring characteristic. Thereby when a small vibration is inputted, the spring constant is lowered. On the other hand, when a large vibration is inputted the spring constant is made higher, whereby it can be prevented for the elastic membrane portion to largely deform. At the same time, even when displacement increases by vibration input, since decreasing of the liquid flow in the damping orifice passage can be controlled, damping effect by the damping orifice can be effectively achieved to highly damp the vibration.

The elastic membrane portion formed on at least one of the orifice passage may be provided on the idle orifice passage, whereby it is possible to provide the elastic membrane portion utilizing the idle orifice having relatively broad width. Thereby, the elastic membrane portion is easily formed and an amount of elastic deformation is made large by widening the elastic membrane portion. Which absorbs more effectively an increasing amount of the liquid pressure and enables to lower the dynamic spring constant still more.

In the elastic mount having a plurality of the passages including two orifice passages and the elastic membrane portion provided on at least one of the orifice passages, a thin wall portion may be provided partially on the elastic member to generate membrane resonance, whereby the thin wall portion can absorb a vibration in a medium frequency range. Consequently, the dynamic spring constant can be lowered over the range from a low frequency to a medium frequency.

By the membrane resonance, we mean a resonance phenomenon of an elastic membrane that is generated when the thin wall portion of the elastic member deforms resiliently with a spring property as a result of liquid flow within the liquid chamber.

In the elastic mount, a medium to high frequency device may be provided on the elastic member projecting into the main liquid chamber to form an orifice gap which generates liquid column resonance between itself and an inner wall surface of the elastic member, whereby the dynamic spring constant is lowered in a medium to high frequency range. Hence by means of the medium to high frequency device, the each orifice passage and the elastic membrane portion, the low dynamic constant can be achieved at the same time in the low frequency range and the medium to high frequency range.

In the elastic mount, the thin wall portion of the elastic member and the medium to high frequency device may be provided simultaneously.

Each orifice passage, the elastic membrane portion, the thin wall portion that is partially provided on the elastic member to generate membrane resonance and the medium to high frequency device are provided simultaneously. Thereby the dynamic spring constant can be lowered over a substantially entire range from the low frequency range to medium to high frequency range.

In the elastic mount, a recess may be formed on an abutting face between a valve portion for opening and closing the idle orifice passage and a member to drive the same, whereby both members are made hard to intimately contact. Since thereby both members can be separated smoothly, when the valve opens, generation of a strange sound can be reduced.

DESCRIPTION OF THE DRAWINGS

An embodiment of the invention will now be described by way of the example and reference to the accompanying drawings, in which.

DETAILED DESCRIPTION OF THE PREFERRED EMBODIMENT

Figure 1:
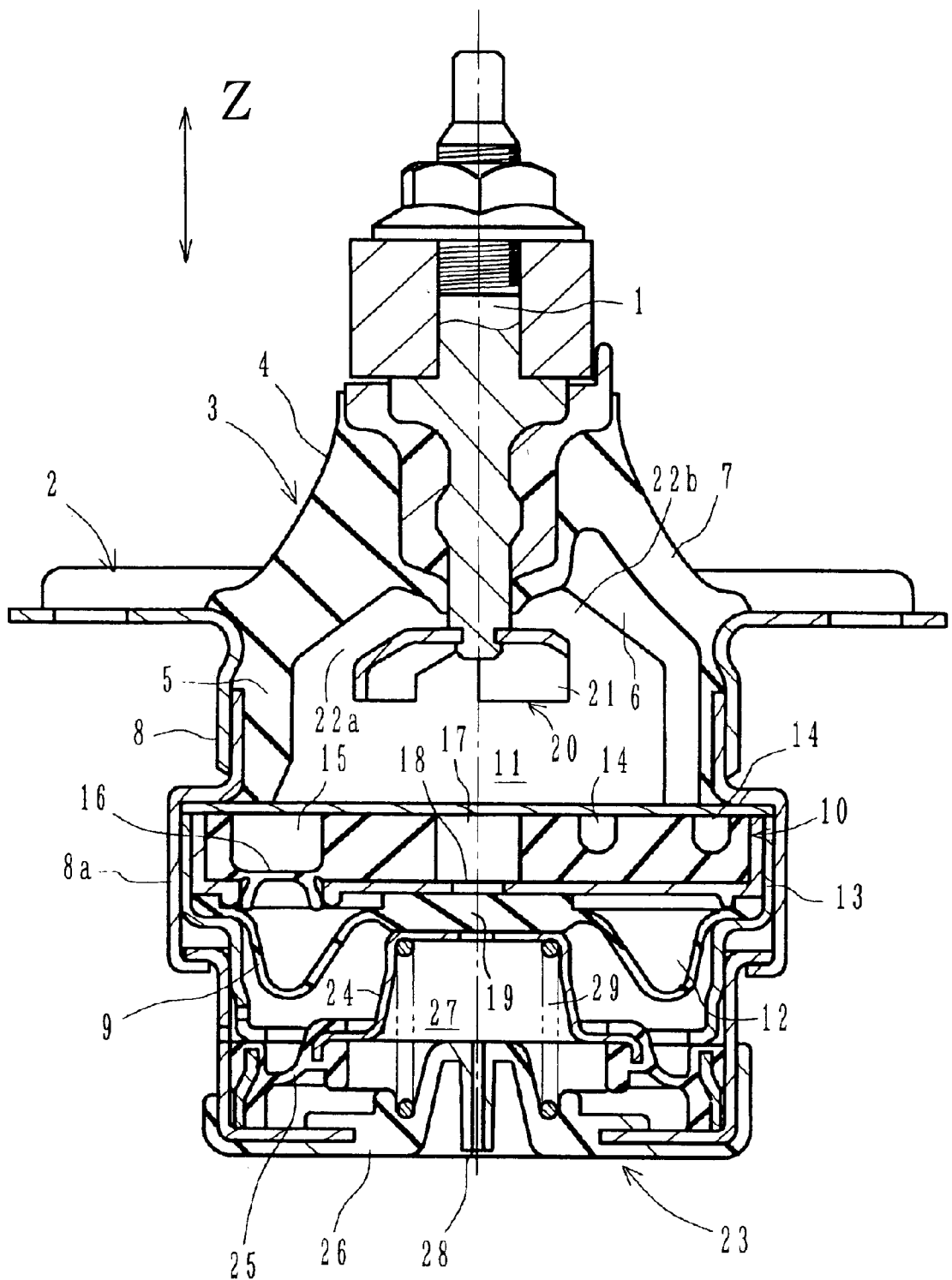
FIG. 1 is a general sectional view of an engine mount for a vehicle as a kind of a liquid sealed mount according to the present embodiment (a sectional view taken along line 1—1 of FIG. 3)
Figure 2:
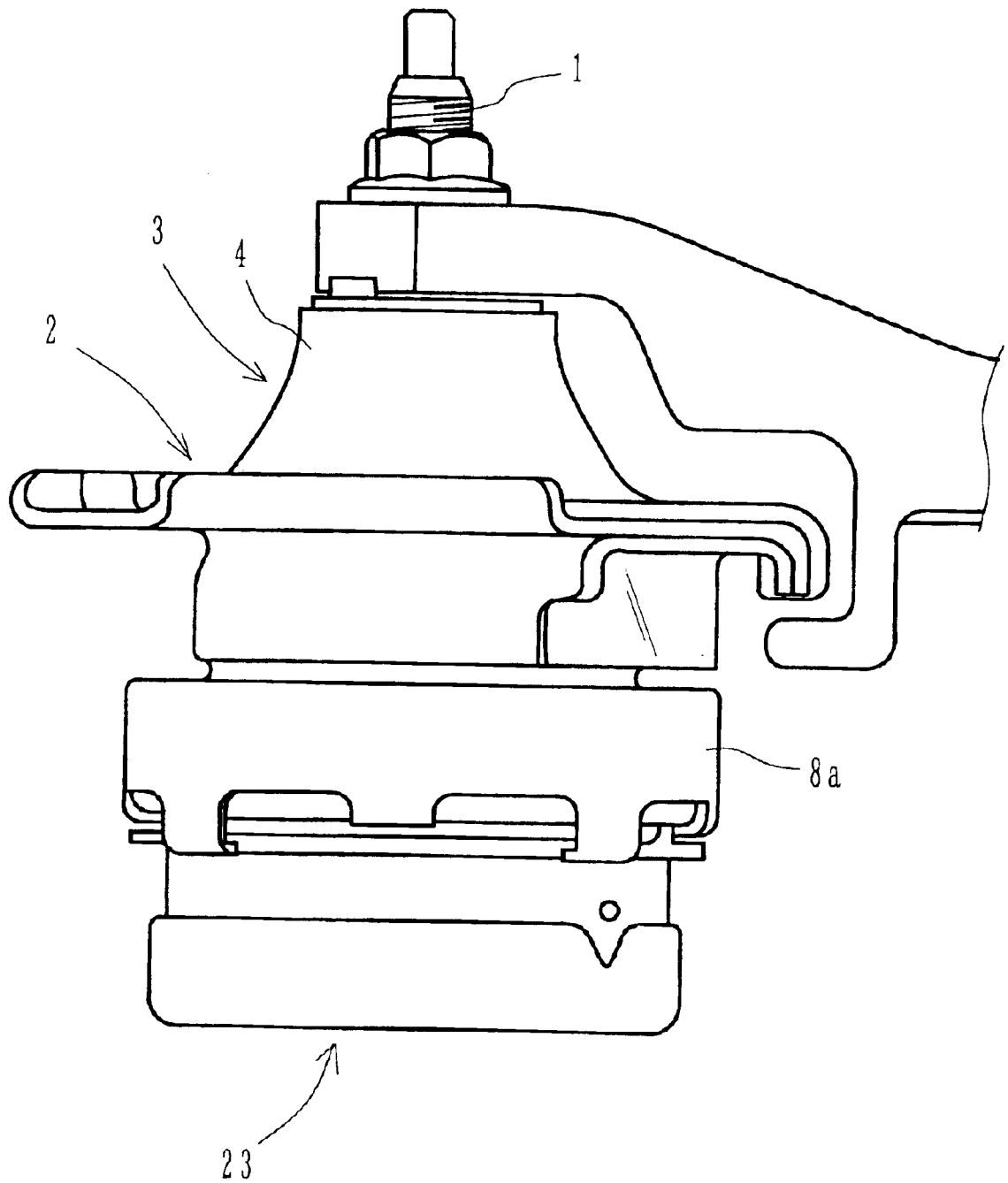
FIG. 2 is a side view thereof.
Figure 3:
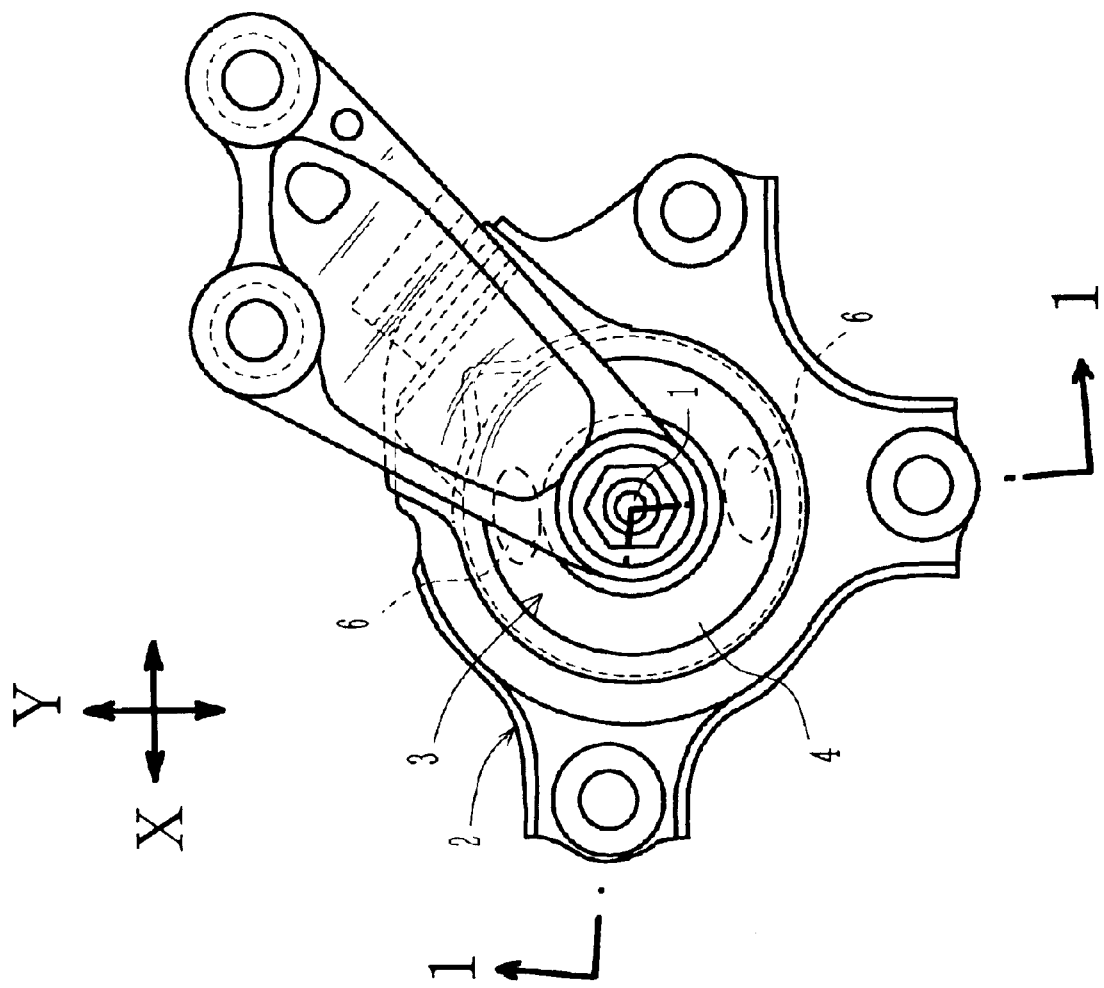
FIG. 3 is a plan view thereof.

As shown in FIGS. 1 to 3, this engine mount comprises a first support member 1 for attachment to an engine side as a vibration source, a second support member 2 for attachment to a vehicle body, and an elastic member 3 interposed between the first and second support members. Hereinafter in two rectangular directions X and Y shown in FIG. 3, we denote X as a longitudinal direction and Y as a lateral direction.

The first support member 1 is of shaft shape and extends into the second support member 2 in a direction parallel to an input direction Z of a principal vibration. The elastic member 3 is formed from a suitable elastic material such as rubber or elastomer and includes a generally conical portion 4 integral with a cylindrical portion 5 to become a kind of spring structuring body formed in a dome shape.

On the inner wall of the conical portion 4, a pair of similarly shaped recess 6 is formed at dimensionally opposite position. Thickness of each recess 6 is arranged to be a thin wall portion 7. The thin wall portions 7 are provided at opposite positions in the lateral direction Y so as to generate membrane resonance by inputting of specified vibration in a medium frequency range. Each recess 6 is continuously formed toward the inside of the cylindrical portion 5. The thin wall portion 7 is adapted to absorb the vibration in the specified medium frequency range by membrane resonance, owing to changing thickness and area of the membrane, through controlling the size and depth of the recess 6.

The cylindrical portion 5 is integrated with an inside face of a cylindrical covering portion 8 of the second support member 2 and defines a liquid chamber in conjunction with a diaphragm 9 fixed to the inside of the cylindrical portion 8 and the elastic member 3. This liquid chamber is divided into a main liquid chamber 11 on the first support member 1 side and an auxiliary liquid chamber 12 on the diaphragm 9 side, by a partition member 10 provided on the inner side of the diaphragm 9. A rim portion of the diaphragm 9 is fixed to a rim portion of the partition member 10 at an end of a cylindrical member 13.

In the partition member 10, two orifice passages of a damping orifice passage 14 and an idle orifice passage 15 are formed respectively communicating the main liquid chamber 11 and the auxiliary liquid chamber 12. The damping orifice passage 14 communicates always the main liquid chamber 11 and the auxiliary liquid chamber 12, and the idle orifice passage 15 is adapted to be open and close type.

A part of the idle orifice 15 is formed to be an elastic membrane portion 16. A central hole 17 formed at a central region of the partition member 10 is communicated with a central outlet 18 of the partition member 10. This central outlet 18 is opened and closed by a valve portion 19 which is formed at a central portion of the diaphragm 9.

The first support member 1 extends along a center line of the elastic member 3 and an end thereof projects into the main liquid chamber 11, where a medium to high frequency device 20 is fixed to the tip of the elastic member 3 by caulking. The medium to high frequency device 20 is formed substantially in an oval shape, though it is somewhat hard to grasp from the drawing, as viewed in an axial direction of the first support member 1, namely an input direction Z of a principal vibration. The shape of the medium to high frequency device is such that a part of a circle in a lateral direction is partially cut out. As a result, it is formed to be wide in a longitudinal direction X, and narrow in a lataral direction Y.

On a periphery of the medium to high frequency device 20, a flange shaped wall portion 21 is formed but not on the lateral direction Y side. Therefore, a part in the lateral direction Y is opened as an opening portion which faces to the thin wall portion 7 in a space surrounded by the wall portion 21. Incidentally, compared to a case that the medium to high frequency device is formed to be a true circle and the opening portion is not provided on a flange shaped peripheral wall portion, this medium to high frequency device 20 is arranged to decrease liquid flow when a vibration in the medium to high frequency range is inputted.

Between a periphery of the medium to high frequency device 20 and an inside of the conical portion 4, a gap is formed to allow liquid flow. But because the medium to high frequency device 20 is formed in a oval shape and the recess 6 is partially formed inside the conical portion 4, the gap varies unevenly on the periphery of the medium to high frequency device 20.

That is to say, in the longitudinal direction X, the wide portion of the medium to high frequency device 20 faces to a generally thick portion of the conical portion 4 or a part on which the thick wall portion 7 is not formed, which forms a narrow flowing gap 22a between itself and the inside of the conical portion 4. Alternatively, in the lateral direction, since the narrow portion of the medium to high frequency device 20 faces to the recess 6 having the thick portion 7, a wide flowing gap 22b is formed as compared to the narrow flowing gap 22a.

The thin wall portion 7 is arranged to deform much easily compared to the general thick wall portion. When volume of the main liquid chamber 11 varies accompanying with the vibration input and liquid flow generates, the thick wall portion 7 is arranged to generate membrane resonance in a specified medium frequency range. In the wider flowing gap 22b, liquid column resonance is arranged to generate at a specified frequency in the medium to high frequency range higher than the frequency of the membrane resonance.

These membrane resonance and liquid column resonance are each other cooperated and the low dynamic spring constant is yielded over wide frequency range. In addition, by way of decreasing amount of liquid flow in said wide flowing gap 22b, resonance energy generated by liquid column resonance in this range can be closed to resonance energy in membrane resonance generated by the thin wall portion 7. In this embodiment, the liquid column resonance in the narrow flowing gap 22a is arranged not to generate in a range from low frequency to medium to high frequency. However, it is possible to optionally tune each resonance point.

The valve portion 19 is actuated to open or close by a valve-driving portion 23. This valve driving portion 23 composes an elastic control mechanism with the valve portion 19 and the idle orifice passage 15. An outside of the cylindrical member 13 is fixed by caulking on a tip portion of an extended fixing portion 8a which extends integrally from the cylindrical covering portion 8. At the time a projecting end portion of the cylindrical member 13 functions as a positioning member.

The valve driving portion 23 forms a sealed space 27 with a substantially inverted cup-shaped abutting portion 24 which abuts to the valve portion 19, an elastic cylindrical portion 25 which intimately stick to a periphery of the abutting portion 24 with an end thereof, and a bottom member 26 which closes other end of the cylindrical portion 25. The valve driving portion 23 is connected to a negative pressure source through a joint pipe portion 28.

When a pressure in the sealed space 27 is made negative, the valve driving portion 23 becomes in a valve opening state and the abutting portion 24 removes toward a bottom member 26 against elasticity of a coil spring 29 which is provided inside the sealed space 27. Whereby the valve potion 19, which has been still then pushed against periphery of the central outlet 18 by elasticity of the coil spring 29 through the abutting portion 24, is arranged to detach from the central outlet 18 to release the idle orifice passage 15.

On a contacting face of the valve portion 19 that contacts with the abutting portion 24, a stick preventing portion (not shown) is formed as a substantially crisscross shaped groove. When the valve opens, this causes the abutting portion 24 to easily separate from the valve portion 19 to which the same has tightly stuck till then. Hence generation of a strange sound when the abutting portion separates from the valve portion is reduced.

Figure 11:
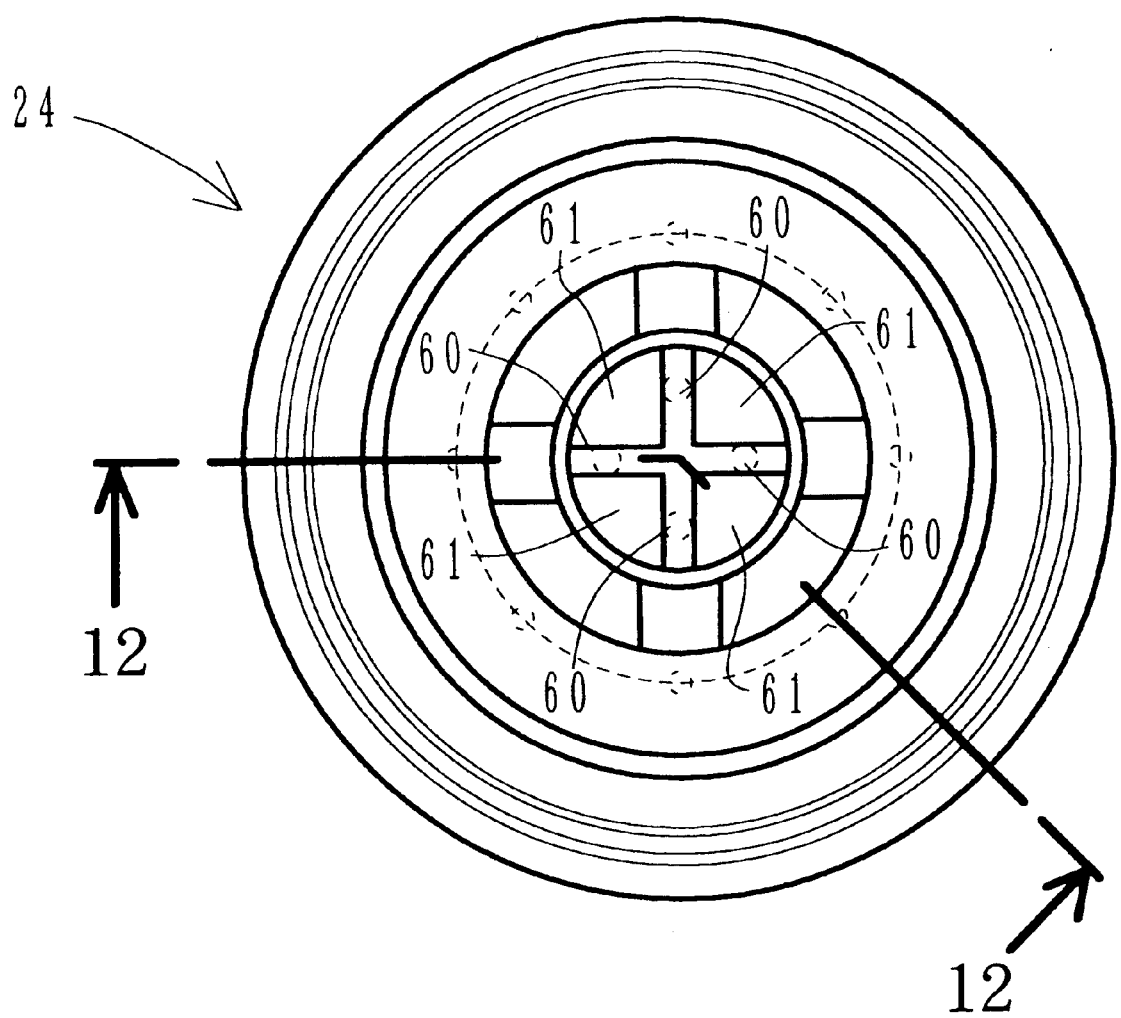
FIG. 11 is an alternative embodiment of a valve operating member.
Figure 12:
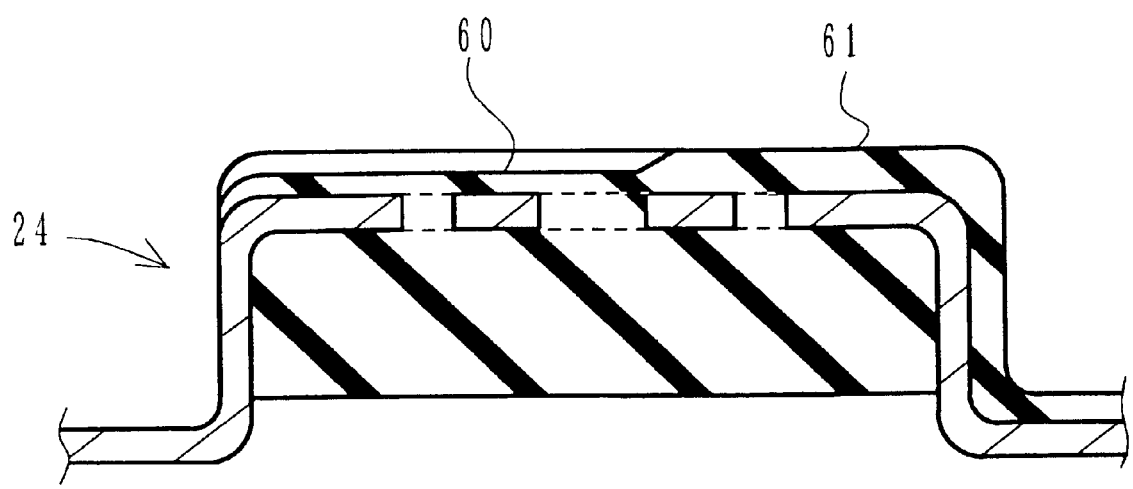
FIG. 12 is a sectional view taken along line 12—12 of FIG. 11.

FIG. 11 and FIG. 12 show an alternative embodiment relating to the stick-preventing portion 60, where the portion 60 is formed on the abutting portion 24 side. That is to say, the stick preventing portion 60 is formed as a substantially crisscross shaped groove by way of thickness change of an elastic covering portion 61 such as rubber which is formed to cover integrally on the abutting portion 24. In this case, it is not required to machine on the valve 9 side. The stick preventing portion is formed not only in a cross shaped groove but also in a scattered spot shape and the like in which anything is allowed if not excessively stick and not easily separated.

Figure 4:
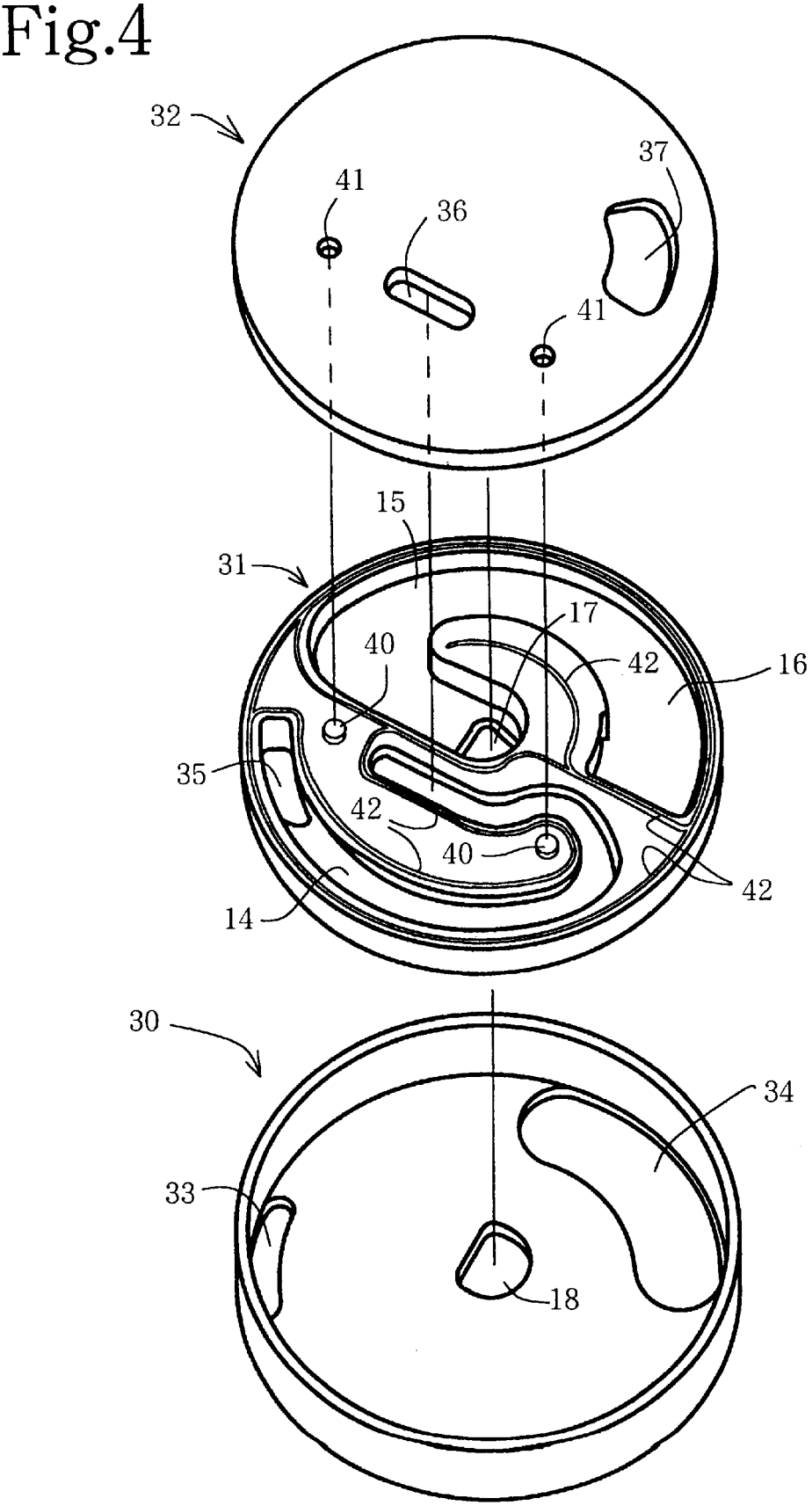
FIG. 4 is an exploded perspective view of a partition member.

Referring FIG. 4 to FIG. 10, constitution of the partition member 10 will be explained in detail. As shown in FIG. 4, the partition member 10 comprises an upwardly opened substantially cup-shaped support member 30, a circular and thick orifice member 31 fitted inside of the support member 30, and a disk shaped cover 32 covered on the same.

The support member 30 is composed of a suitable material such as relatively stiff metal or resin. At a central region of the support member 30, the central outlet 18 is formed, and on a substantially symmetric peripheral position across the central outlet, two openings of a damping orifice outlet 33 and an elastic membrane-releasing portion 34 are formed.

Figure 6:
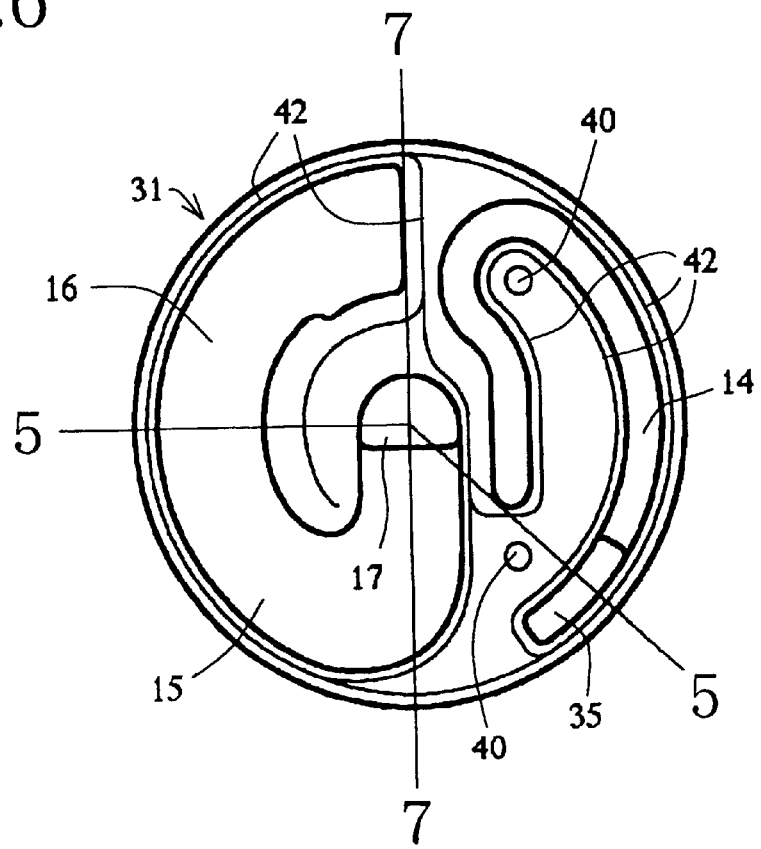
FIG. 6 is a plan view of an orifice member.
Figure 7:
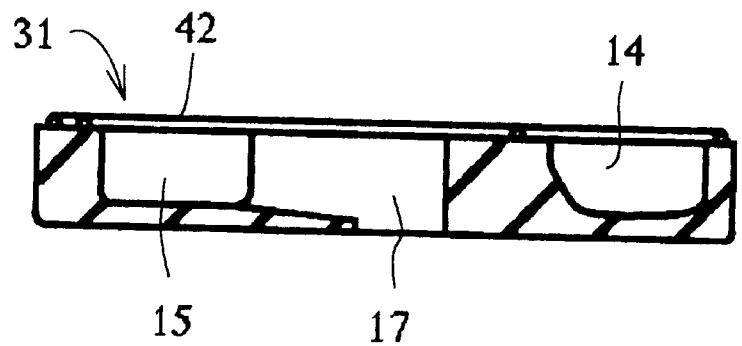
FIG. 7 is a sectional view thereof.

The orifice member 31 is composed of an elastic material such as rubber, elastomer and the like. As is shown in FIG. 6, the orifice member 31 is divided into a part where the damping orifice passage 14 is formed and a part where the idle orifice passage 15 is formed. The damping orifice passage 14 is an upwardly opened substantially U shaped groove and an end portion thereof on an outer periphery side is arranged to be an outlet 35 to overlap with the damping orifice outlet 33. Another end of the damping orifice passage 14 overlaps with a damping orifice inlet 36 formed at a central side of the cover 32, from where the damping orifice passage 14 communicates with the main liquid chamber 11.

The idle orifice passage 15 is formed similarly as the damping orifice passage 14, but different in a point that it is formed in a wide and slope-like shape slanting toward the center hole 17. A bottom side of the idle orifice 15 is formed as a thin wall portion to become an integrated elastic membrane portion 16. An upper portion of the idle orifice passage 15 overlaps with an idle orifice inlet 37 formed at an outer peripheral portion of the cover 32, from where the idle orifice passage 15 is communicates with the main liquid chamber 11.

Figure 5:
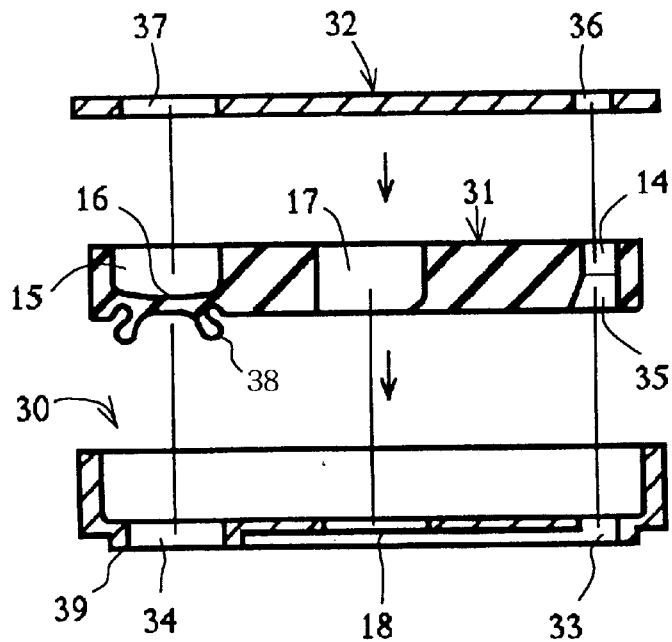
FIG. 5 is a sectional view thereof.
Figure 8:
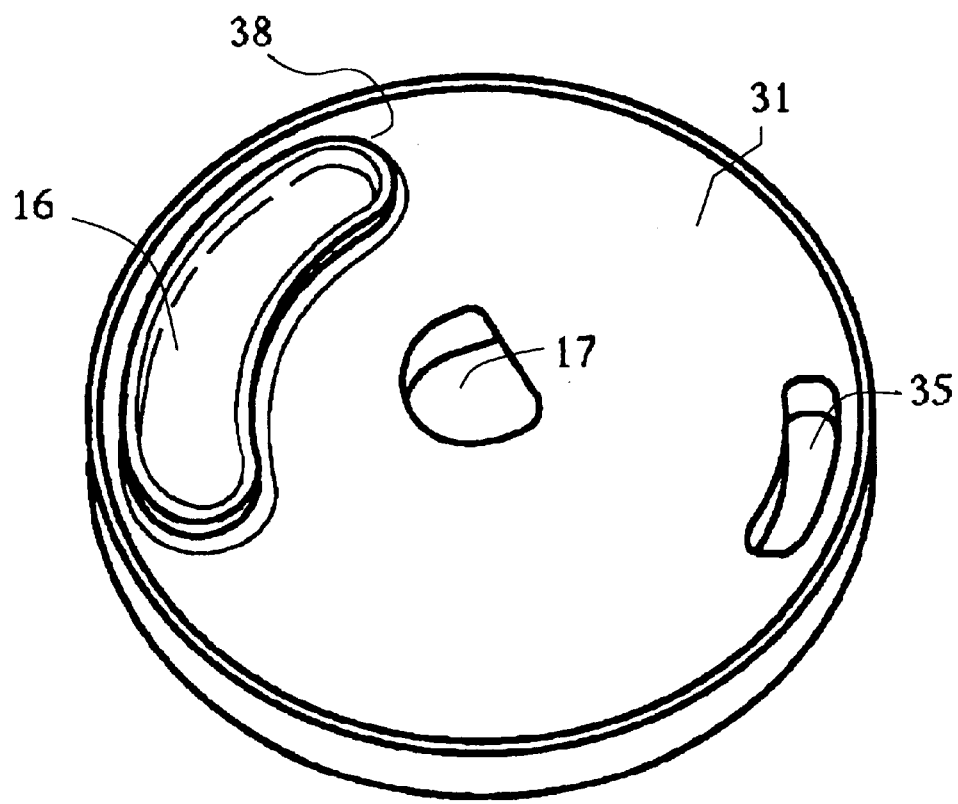
FIG. 8 is a perspective view showing a bottom side of an orifice member.
Figure 9:
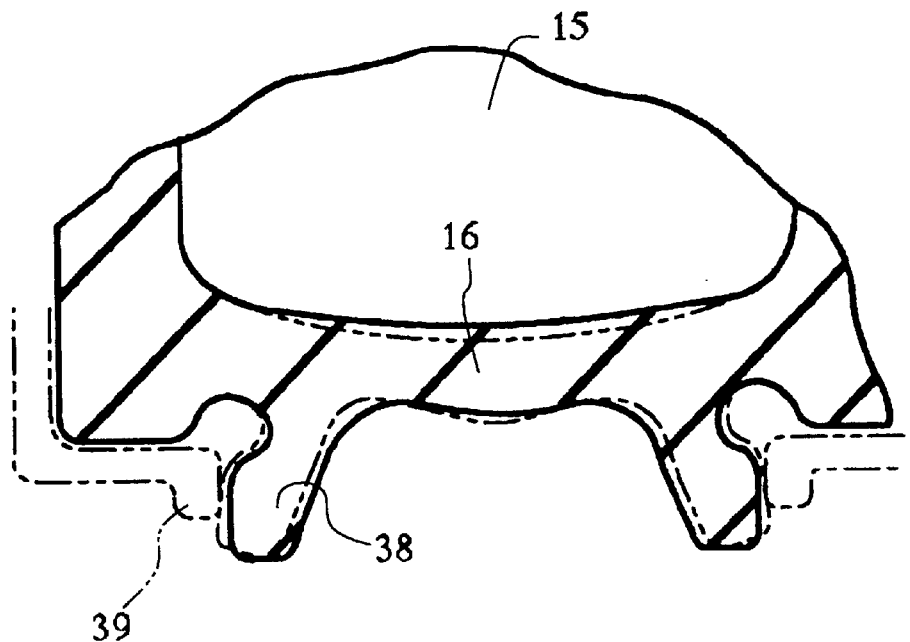
FIG. 9 is an enlarge sectional view of an elastic membrane portion.
Figure 10:
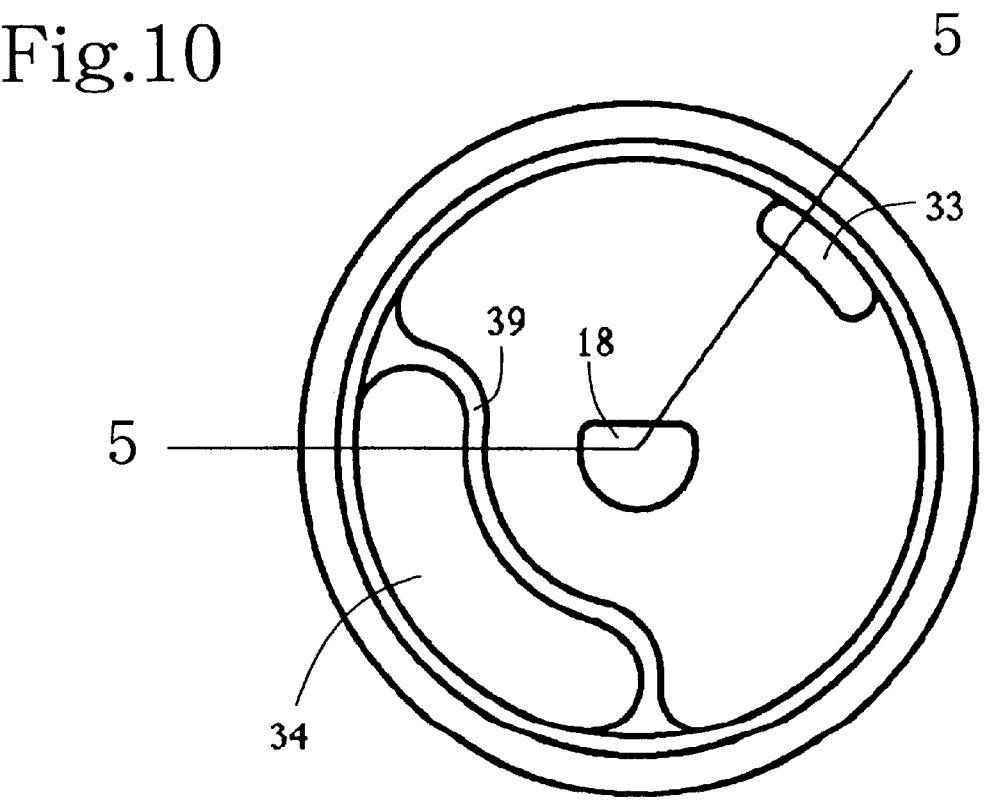
FIG. 10 is a bottom view of a cup shaped member.

The elastic membrane portion 16 is, as is apparent from FIGS. 5, 8 and 9, formed integrally with a annular projection 38 which fits into the elastic membrane releasing portion 34. In a non-loading condition, the elastic membrane portion 16 is arranged to confront with some gap which is formed integrally on a part surrounding the elastic membrane releasing portion 34 of the support member 30 (see FIG. 9).

The annular projection 38 is formed in such a way that a tip end thereof opens outwardly and becomes an example of the large deformation control portion of the present invention. In addition, the annular projection 38 cooperates with the flange 39 and functions as a part to render a non-linear spring characteristic to the elastic membrane portion 16. That is to say, when a relatively small vibration inputs, the annular projection 38 becomes a free condition of not contacting to the flange 39 or a light deformation controlling condition of slightly contacting to that.

When the vibration gradually increases, the annular projection 38 becomes to be strongly abutted to the flange 39 and the spring constant of the elastic membrane portion 16 changes to higher one by a reaction of abutting to control elastic deformation. This causes, according to amount of the vibration input, the annular projection 38 to change the spring constant of the elastic membrane portion 16 with the flange 39 and makes the spring characteristic of the elastic membrane 16 non-linear.

Furthermore, when a larger vibration than a specified value (for example about 13 mm amplitude) is inputted, because a reaction from the flange 39 side becomes much large, the elastic membrane portion 16 can not more deform elastically. Such being the case, the annular projection 38 prevents the large deformation such as adversely affecting durability of the elastic membrane 16, so functions as the large deformation control portion. Degree of the large deformation to be prevented may be optionally set to meet a real usage.

For the large deformation control portion, a suitable construction can be adopted such that a part of the flange 39 is protruded to abut to the elastic membrane portion 16 at a deformation limit. Also various constructions are available for the annular projection 38 as a functional member giving a nonlinear spring characteristic to the elastic membrane portion 16. For example, when a tip end portion of the annular projection 38 is formed in gradually narrowing shape by an acute angle and is bent to be generally L-shape so as to abut substantially perpendicularly to the flange 39, an remarkably non-linear spring characteristic can be achieved.

In this time, if a gap is previously provided between the annular projection 38 and the flange 39, it is useful for attaining such a non-linear spring characteristic. However, this gap is not necessarily provided. In a case that the annular projection 38 has been previously compressed and then pressed and contacted to the flange 39, a tightening margin is set according to a degree of pressing and contacting of the annular projection 38. A variation of the spring characteristic may be obtained by way of suitably controlling of this tightening margin.

A reference numeral 40 in FIGS. 4 and 6 denotes a pair of positioning projection integrally formed with the orifice member 31. These projections fit into a pair of small holes 41 formed at positions across the damping orifice inlet 36 of the cover 32, and the orifice member 31 and the cover 32 are assembled while the two members are mutually positioned by means of the positioning projections and the small holes. A reference numeral 42 denotes a seal projection which is formed integrally on a surface of the orifice member 31 and intimately contact with the cover 32 to prevent a liquid leak in each orifice passage.

Figure 13:
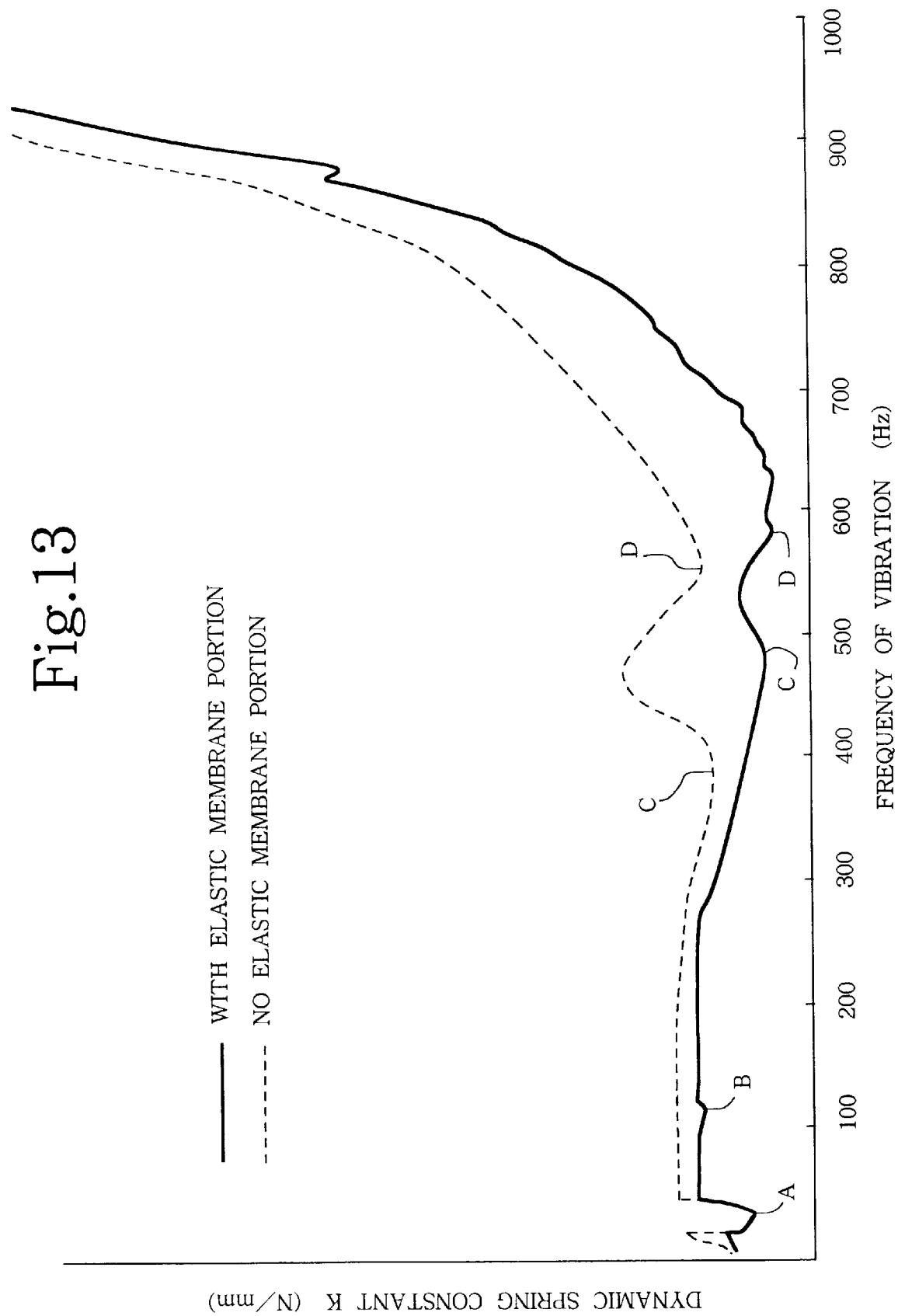
FIG. 13 is a graph showing a dynamic spring characteristic of an engine mount according to the present embodiment.

The operation of the present embodiments will now be described. FIG. 13 is a graph showing a relation of the dynamic spring constant and frequency of the engine mount in the present embodiment. In the graph, a solid line shows the present embodiment and a dotted line shows a comparative example which is different from the embodiment only in a point lacking the elastic membrane portion.

The dynamic spring characteristics of the present embodiment are outlined. In a low frequency range, the vibration input in a lower frequency than an engine idling frequency range is absorbed by liquid column resonance in the damping orifice passage 14. In the engine idling frequency range, the idle orifice passage 15 opens and the vibration input is absorbed by the liquid column resonance (a resonance point A in FIG. 13) in the idle orifice passage 15.

In a medium frequency range where the idle orifice passage 15 is again closed, membrane resonance (a resonance point B) is generated by the elastic membrane portion 16 at a relatively low frequency. At a relatively high frequency in the medium frequency range, a resonance point C occurs where the membrane resonance by the thin wall portion is mainly generated. These resonance respectively serve to lower the dynamic spring constant in the medium frequency range.

In a medium to high frequency range, a resonance point D occurs at a region where the liquid column resonance is mainly generated by the medium to high frequency device 20. This makes the dynamic spring constant lower in the medium to high frequency range. In this case, since the medium to high frequency device 20 is formed in an oval shape and arranged to combine with the thin wall portion 7, resonance range can be expanded. Furthermore, since the dynamic spring constant at the resonance point D can be approached to that at the resonance point C by decreasing amount of liquid flow by the medium to high frequency device 20, it become possible to make the dynamic spring constant much lower.

Accordingly, the low dynamic spring constant is achieved as a whole over a wide range from the low frequency range to the medium to high frequency range. In a comparative example also, the resonance points A, C and D exist similarly and considerably low dynamic spring constant is achieved as a whole, but is not as low as the present embodiment. It is apparent that this difference is caused by existence of the elastic membrane portion 16, and this is the only different point in the construction between the present embodiment and the comparative example. By the elastic membrane portion 16, it becomes possible to still more lower the dynamic spring constant.

Hereupon the operation of the elastic membrane portion 16 will be described. When an inner pressure in the main liquid chamber 11 increases, the elastic membrane portion 16 elastically deforms and absorbs the increased pressure in some degree. Therefore, comparing with the comparative example, the present embodiment makes it possible to lower the dynamic spring constant over the whole frequency range.

Figure 14:
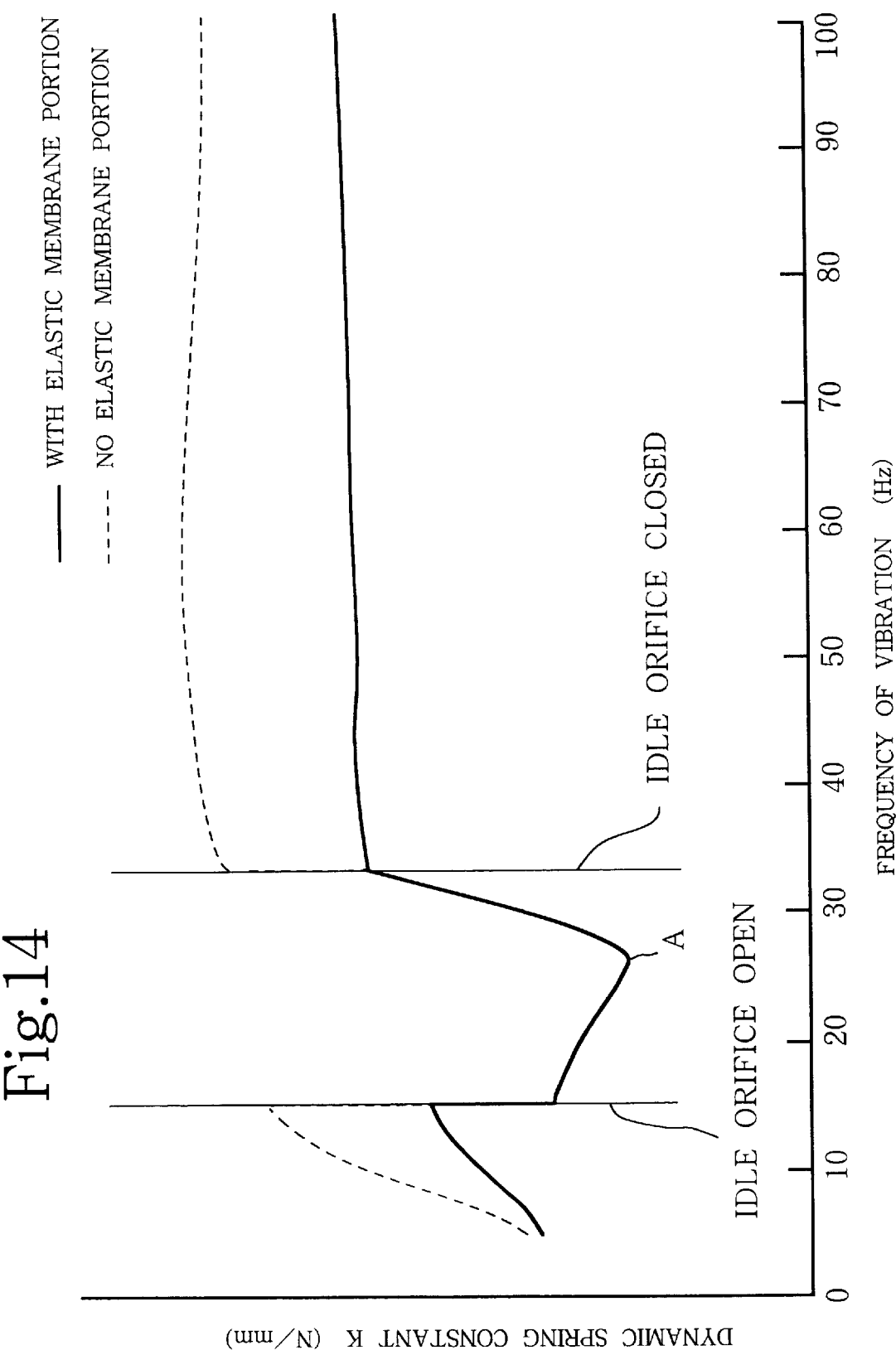
FIG. 14 is an expanded graph showing a part from a low frequency range to a medium frequency range of FIG. 13.

As is shown in FIG. 14, especially in the low frequency range, when the idle orifice passage 15 closes, the inner pressure suddenly rises and the dynamic spring constant tend to be high. The elastic membrane portion 16 can relieve the sudden pressure rising by the elastic deformation thereof. The elastic membrane 16 makes the dynamic spring constant still lower in an operation range of the damping orifice passage 14 in the lower frequency than the resonance point A.

Additionally, the elastic membrane portion 16 can contribute to make the dynamic spring constant low not only by the elastic deformation but also by the membrane resonance. That is to say, the elastic membrane portion 16 itself resonates by membrane at a natural resonance point B that is in relatively low frequency side in the medium frequency range. This can also lower the dynamic spring constant in this frequency range.

Figure 15:
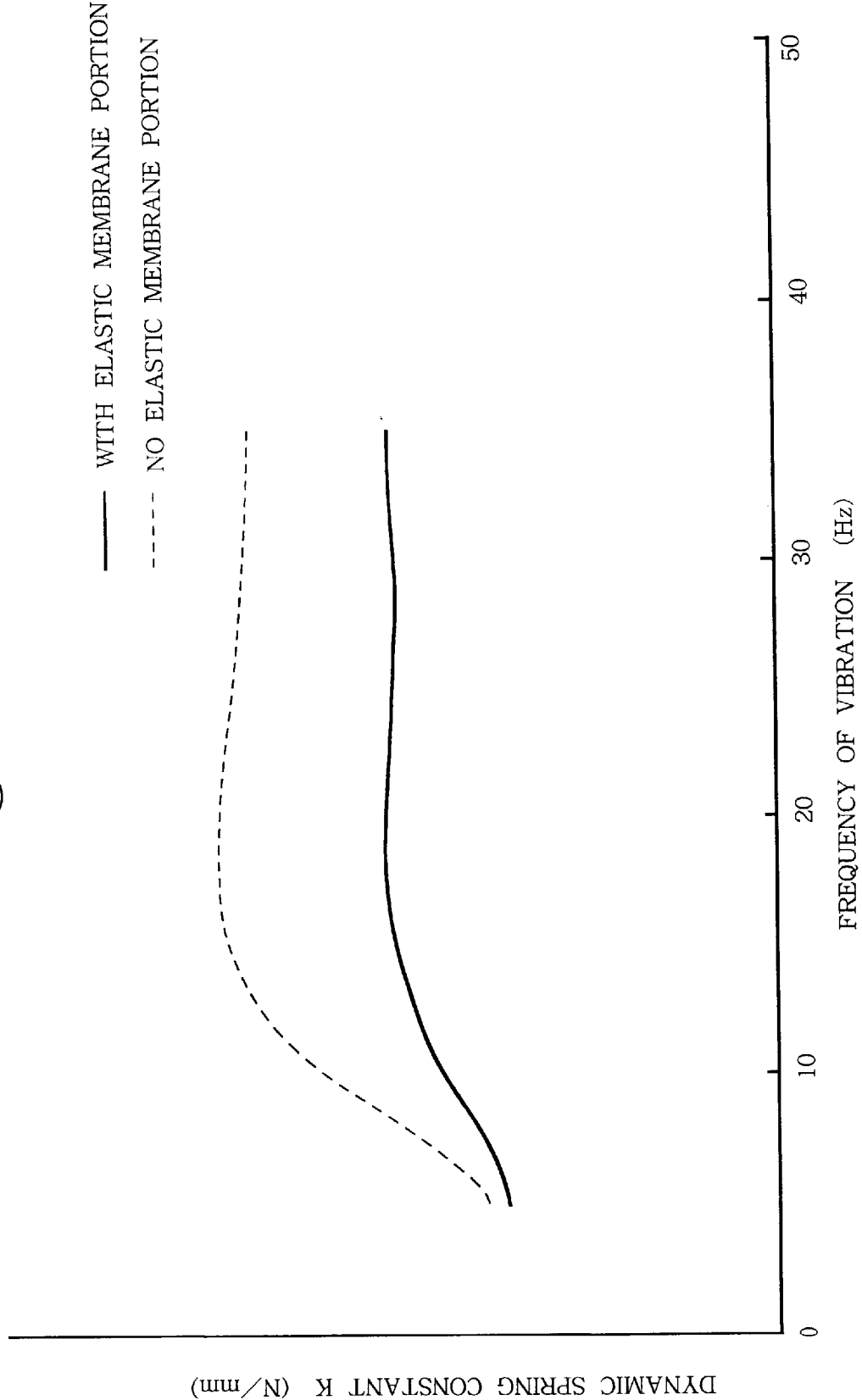
FIG. 15 is a graph showing dynamic spring characteristics at a low frequency range in a state of closing an idle orifice passage.
Figure 16:
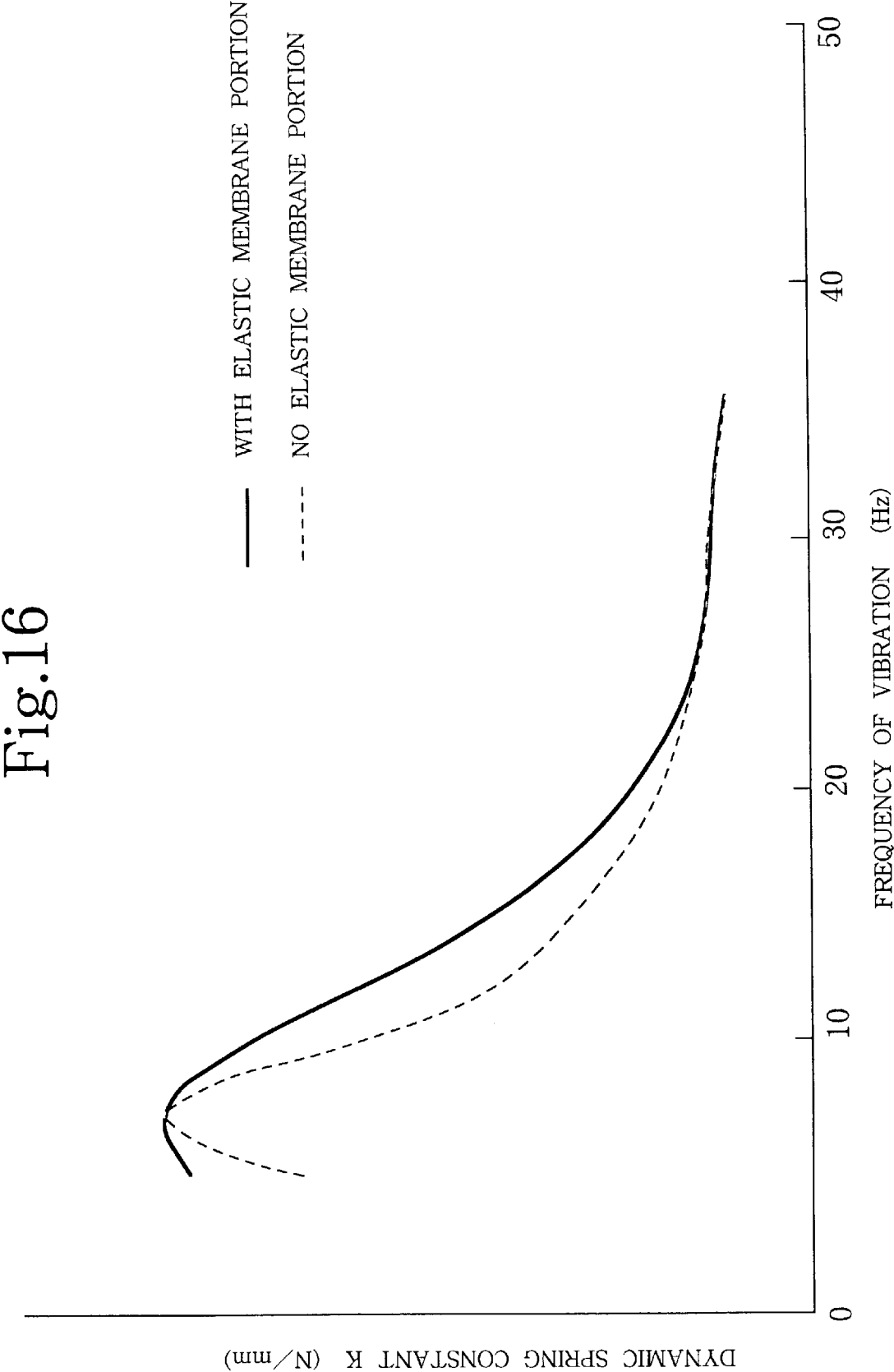
FIG. 16 is a graph showing damping characteristics in the same state.

FIG. 15 is a graph showing the dynamic spring characteristics in the low frequency and in a state that the idle orifice passage 15 is closed and FIG. 16 is a graph showing the damping characteristics in the same state. As is apparent from these graphs, even in a case that liquid flows only in the damping orifice passage 14, the present embodiment (solid line) having the elastic membrane portion shows a lower dynamic spring constant (see FIG. 15) and higher damping (see FIG. 16) over the wider frequency range than the conventional example (dotted line) lacking the elastic membrane.

Consequently, in the low frequency range where effective absorption of an engine vibration is required, a frequency range of the low dynamic spring and high vibration damping can be broadened. Therefore, even in a case that magnitude of the engine vibration varies, absorption of vibration can be steadily practiced.

As is shown in FIG. 9, when the elastic membrane portion 16 elastically deforms, according to the displacing amount thereof, the annular projection 38, a tip of which is previously formed in outwardly opened shape, changes opening angle thereof. In a state of FIG. 9, when a central region of the elastic membrane portion 16 warps downwardly, the tip of the annular projection 38 changes as it gradually open sideways and becomes at last to be strongly abutted to the flange 39.

Therefore, the more the inner pressure increases and makes the elastic membrane portion 16 elastically deform, the larger becomes a reaction from the flange 39, and the reaction acts so as to control the elastic deformation of the elastic membrane portion 16. As a result, spring elasticity of the elastic membrane portion 16 enlarges and the dynamic spring constant exhibit a nonlinear characteristic that suddenly changes from the low dynamic spring constant to the high dynamic spring constant by a large vibration input. The amount of deformation of the elastic membrane portion 16 changes in nonlinear or is not proportional to an amount of displacement of the vibration input.

This result in that the elastic membrane portion 16, when a small vibration is inputted, becomes a state of low spring elasticity which effectively absorbs increasing of the liquid pressure and make it possible to lower the dynamic spring constant. On the other hand, when the large vibration is inputted, the elastic membrane portion 16 becomes a state of high spring elasticity, which can effectively maintain an orifice effect by the orifice passage, especially a damping effect in the orifice passage 14.

That is to say, if the elastic membrane portion 16 had not such non-linear characteristics, liquid flow into the damping orifice passage 14 should not increase for magnitude of the vibration input. This is because increase of the inner pressure is absorbed by deformation of the elastic membrane portion 16 proportional to increase of the inner pressure in the main liquid chamber 11 accompanying with large vibration input. As a result, the vibration does not decrease as expected but rather becomes low decreasing state, which does not bring effectively damping ability by the damping orifice passage 14.

In the present embodiment however, since the elastic membrane portion 16 have a non-linear characteristic, the portion becomes a state of high spring elasticity when the large vibration is inputted, and deformation rate for the vibration input is gradually reduced. This secures liquid flow into the damping orifice passage 14 matching amount of the vibration input. As a result, it is possible to gain high damping state where damping condition is effectively brought by the damping orifice passage 14.

Such effect based on the non-linear characteristic of the elastic membrane portion 16 is available for not only the damping orifice passage 14 but an orifice passage having a different characteristic. Because the elastic membrane portion 16 acts similarly to restrain variation of the liquid flow into the orifice passage corresponding to magnitude of the vibration input, even when magnitude of the vibration input varies, a constant orifice characteristic can be achieved.

Moreover, since the annular projection 38 is provided as the large deformation control portion, when the large vibration is inputted, the annular projection 38 prevents large deformation of the elastic membrane portion 16 while being abutted to the flange 39. Whereby damage to the elastic membrane portion 16 is prevented, so durability of the device can be improved.

In this time, since the flange 39 is formed integrally with the support member 30, it is unnecessary to form particularly another member to fix thereto. Which can simplify construction of the device and make it easy to manufacture the same. It is also possible to omit the annular projection 38 or the flange 39. In this case, it is sufficient to provide a stopper formed in a plate shape or the like for preventing large deformation of the elastic membrane portion 16 to the elastic membrane releasing portion 34 integrally with or separately from the support member 30.

Furthermore, since the elastic membrane portion 16 is integrated with the idle orifice 15, it is easily formed utilizing elasticity of the orifice member 31. Because it is unnecessary to particularly form the elastic membrane portion 16 solely, it is easy to form the same. Therefore, it can be achieved to decrease the number of parts, to reduce working costs, to cut down assembling man-hour, and to stabilize quality of the device.

Moreover, since it becomes unnecessary to provide the elastic membrane portion 16 at a position away from the orifice passage 15, constitution of the liquid sealed mount becomes simple and miniaturization of the mount becomes possible. (This effect is common for a case that the elastic membrane portion 16 is provided separately from the orifice passage as described hereinafter.)

Additionally, since the elastic membrane portion 16 can be provided utilizing the idle orifice 15 having relatively broad width, forming of the elastic membrane portion 16 becomes easy. If amount of elastic deformation is increased by widening the elastic membrane portion 16, increasing of the inner pressure is effectively absorbed and it may be still more possible to lower dynamic spring constant.

Further, since the elastic membrane portion 16 is provided at a position adjacent to the inlet 37 of the idle orifice 15, a high-pressure part of liquid flowing into the idle orifice 15 can be flowed onto the elastic membrane portion 16. Which makes elastic deformation of the elastic membrane portion 16 large and effectively absorbs increasing of inner pressure. The annular projection 38 as the large deformation control portion is provided with a part of the elastic membrane portion 16, it becomes easy to form the large deformation control portion.

The present invention may be practiced in various ways not limited to the above stated embodiment. For example, the elastic membrane portion 16 may be provided not to the idle orifice passage 15 but to the damping orifice passage 14 side or to both orifice passages. The elastic membrane portion 16 formed in a separated body from these orifice passages can be fixed to a part of the orifice passage. A shape and a kind of the orifice passage is optionally selectable and the number thereof is also optional so that the larger number of passages than the present embodiment are provided.

When the elastic membrane portion is formed in the separated body from the orifice passage, since the material of the elastic membrane portion can be changed from that of other orifice passage composing part, the characteristic of the elastic membrane portion can be easily chanced. This is convenient in tuning of the dynamic spring constant. When the elastic membrane portion is formed on another orifice passage except the idle orifice passage, it is expected to lower the dynamic spring constant in the low frequency range as similar as the case that the same is formed on the idle orifice passage.

Various kind of constitution is available for the liquid sealed mount as an object for which provided with the orifice passage having said elastic membrane portion. Namely as described hereinbefore, such mount is available lacking one or more constructions from the present embodiment. In such constructions there are a construction that the thin wall portion is provided on the elastic member for membrane resonance, a construction provided with the medium to high frequency device, and a construction provided with the idle orifice passage and open and close mechanism thereof.

What is claimed is:

1. A liquid sealed type elastic mount comprising:
    a first support member for attachment to a vibration source;
    a second support member for attachment to a vehicle body;
    an elastic member of substantially conical shape interposed between the first and second support members, the first support member and second support member being adapted to form a liquid chamber therebetween with at least a part of a wall thereof;
    a partition wall dividing the liquid chamber into a main liquid chamber and an auxiliary liquid chamber;
    at least one orifice passage formed within the partition wall for normally communicating the two liquid chambers; and
    wherein a part of the orifice passage is formed of an elastic membrane portion having a thin wall portion, which is thinner than a wall thickness of the orifice passage to deform elastically by rising of an inner pressure of the sealed liquid.

2. The elastic mount according to claim 1, wherein said elastic membrane portion is provided close to an inlet of the orifice passage.

3. The elastic mount according to claim 1, wherein said elastic membrane portion is formed to be one body with the orifice passage or a separated body therefrom.

4. The elastic mount according to claim 1, wherein said elastic membrane portion shows a nonlinear spring characteristic for an input vibration.

5. The elastic mount according to claim 4, wherein a large deformation-controlling portion is formed on a part of said elastic membrane portion so as to prevent large deformation with large vibration inputs.

6. The elastic mount according to claim 1, wherein said orifice passage comprises a plurality of passages including a damping orifice passage communicating with the main and auxiliary liquid chambers and an open and close type idle orifice passage communicating only when it is in an engine idling condition, said elastic membrane portion is formed on at least one of said orifice passages.

7. The elastic mount according to claim 6, wherein said elastic membrane portion shows nonlinear spring characteristic for an input vibration.

8. The elastic mount according to claim 6, wherein said elastic membrane portion is provided on the idle orifice passage.

9. The elastic mount according to claim 6, wherein the thin wall portion is provided on a part of said elastic member to generate membrane resonance.

10. The elastic mount according to claim 9, wherein the thin wall portion of the elastic member and a medium to high frequency device are provided simultaneously.

11. The elastic mount according to claim 6, wherein a medium to high frequency device is provided on said elastic member projecting into the main liquid chamber to form an orifice gap which generates liquid column resonance between itself and an inner wall surface of the elastic member.

12. The elastic mount according to claim 6, wherein further comprising a valve portion for opening and closing said idle orifice passage and a member to drive the same, and a recess is formed on an abutting face of both members.

13. The elastic mount according to claim 1, wherein said elastic membrane portion further comprises an annular projection.

14. The elastic mount according to claim 1, wherein said annular projection is formed by a tip end thereof and opens outwardly.

* * * * *